US006706079B1

United States Patent
Shmatko et al.

(10) Patent No.: US 6,706,079 B1
(45) Date of Patent: Mar. 16, 2004

(54) METHOD OF FORMATION AND CHARGE OF THE NEGATIVE POLARIZABLE CARBON ELECTRODE IN AN ELECTRIC DOUBLE LAYER CAPACITOR

(75) Inventors: Pavel Andreevich Shmatko, Moscow Region (RU); Nina Azrielevna Urisson, Moscow (RU); Alexey Yurievich Richagov, Moscow (RU); Yuri Mironovich Volfkovich, Moscow (RU)

(73) Assignee: C and T Company, Inc., Vaughn (CA)

( * ) Notice: Subject to any disclaimer, the term of this patent is extended or adjusted under 35 U.S.C. 154(b) by 0 days.

(21) Appl. No.: 10/138,732

(22) Filed: May 3, 2002

(51) Int. Cl.[7] .................................................. H01G 9/00
(52) U.S. Cl. ....................... 29/25.03; 361/502; 361/503
(58) Field of Search ............................ 29/25.01–25.03; 361/502, 503, 521

(56) References Cited

U.S. PATENT DOCUMENTS

| 4,313,084 A | 1/1982 | Hosokawa et al. |
| 4,562,511 A | 12/1985 | Nishino et al. |
| 4,888,666 A | 12/1989 | Naitoh et al. |
| 4,952,861 A | * 8/1990 | Horn |
| 5,953,204 A | * 9/1999 | Suhara et al. |
| 6,094,338 A | * 7/2000 | Hirahara et al. |
| 6,115,235 A | 9/2000 | Naito |

FOREIGN PATENT DOCUMENTS

| JP | 2-11008 | 1/1990 |
| WO | WO 97/00353 | 1/1997 |
| WO | WO 97/07518 | 2/1997 |

* cited by examiner

*Primary Examiner*—Ha Tran Nguyen
(74) *Attorney, Agent, or Firm*—Kilpatrick Stockton LLP

(57) ABSTRACT

A method of formation and charge of a negative polarizable electrode of an electric double layer capacitor. The method can be used for manufacturing of high capacitance capacitors utilizing the energy of the electric double layer. The methods achieve hydrogen evolution on carbonaceous materials using very negative potentials. The methods provide an EDL capacitor, employing an aqueous electrolyte, with improved specific energy. The methods may also ensure the hermeticity of the capacitor. The methods include pretreating the electric double layer capacitor by keeping the negative polarizable electrode at a desired minimum potential prior to use. Desirably, the minimum potential ranges from about −0.25 to about −1.2 V vs. a reference hydrogen electrode.

12 Claims, 6 Drawing Sheets

METHOD OF FORMATION AND CHARGE OF THE NEGATIVE POLARIZABLE CARBON ELECTRODE IN AN ELECTRIC DOUBLE LAYER CAPACITOR

TECHNICAL FIELD OF THE INVENTION

This invention relates to electrical engineering and to capacitor engineering in particular, and can be used for manufacturing of high capacitance capacitors utilizing the energy of the electric double layer (EDL). EDL capacitors have found their use as backup power sources in systems requiring uninterrupted electric power supply, such as computers, communication devices, digital programmable lathes, continuous production cycles; for electric starting of internal combustion engines, powering the engines of wheelchairs, golf carts; etc.

DESCRIPTION OF THE PRIOR ART

Several electric power storage devices exist in the form of electric double layer (EDL) capacitors, for example as described in U.S. Pat. Nos. 4,313,084 and 4,562,511 (1985). Such capacitors consist of two porous polarizable electrodes with a porous separator made of a dielectric material between them and current collectors. A liquid electrolyte, which can be either non-aqueous or aqueous, including an aqueous sulfuric acid solution, is retained in the pores of the electrodes and the separator and in the free volume inside the capacitor case. The electric charge is accumulated in the pores on the interface between the electrode material and the electrolyte. Various porous carbon materials are normally used for manufacturing of polarizable electrodes. To increase the capacitance of the electric double layer capacitor, these carbon materials are subjected to prior activation for the purpose of increasing their specific surface area up to 300–3000 $m^2/g$.

EDL capacitors have much higher capacitance than the conventional electrostatic and electrolytic capacitors—up to hundreds of farads per gram of active electrode material. However, a disadvantage of these capacitors is their rather low specific energy, not exceeding 3 Wh/l. This maximum value of specific energy for double-layer capacitors is set with non-aqueous electrolytes, where the maximum voltage values are in the range of 3 to 3.5 V. However, such capacitors permit very low discharge and charge currents due to the very low conductivity of non-aqueous electrolytes. Still lower specific energies, 0.5 to 2 Wh/l, have been achieved by double-layer capacitors using aqueous electrolytes with maximum voltage value of approximately 0.9 V. When such double-layer capacitors remain under charge for a prolonged period of time (which is often quite long) at voltages higher than 0.9 V, noticeable oxidation of the positive carbon electrode takes place.

Several methods of preparation of polarizable carbon electrodes for EDL capacitors from activated carbon powder have been described. According to one of them [set forth in European Patent No. 414420, a high-voltage pulse is applied to a layer of activated carbon resulting in heating-up the layer to a temperature of 700–1000° C. and its sintering. Thus, a compact electrode is formed.

An electric double layer capacitor having only one polarizable electrode made of a carbon material, has been described elsewhere (see e.g., Patent of Japan, Accepted Application No. 2-11008, published 1990). The other electrode is a non-polarizable (i.e., storage) one, made of lithium or lithium alloy, the electrolyte being non-aqueous. Such a capacitor has higher specific energy compared to the conventional double-layer capacitor with two polarizable electrodes. However, a drawback of this prototype in Patent of Japan, Accepted Application No. 2-11008, is the very low practical charge and discharge current (0.1 to 1 $mA/cm^2$) and, therefore, very low power density as a result of using a non-aqueous electrolyte. Another essential disadvantage of the device in question is its very low cycleability—about 100–200 cycles.

An electric double layer capacitor having only one polarizable electrode made of a fibrous carbonaceous material, has been described elsewhere (see e.g. WO Patent No. 97/07518, Feb. 27, 1997). The other electrode, made of nickel oxide, is slightly polarizable. An aqueous solution of alkaline metal carbonate or hydroxide is used as electrolyte. Such a capacitor excels considerably the double-layer capacitors with two polarizable electrodes in both specific energy (up to 6 Wh/l) and maximum voltage (1.4 V). However, this capacitor has a number of drawbacks, for example it contains emergency valves that make it not entirely hermetical.

A hybrid EDL capacitor, which consists of a polarizable electrode made of porous carbonaceous material, second slightly polarizable electrode employing lead dioxide as an active component, and aqueous solution of sulfuric acid, has been described elsewhere in Patent Application PCT/RU No. 97/00353. It offers considerable advantage over the capacitor in WO Patent No. 97/07518 in its higher maximum charge voltage (approximately 2 V). Thus, specific energy of 10 Wh/kg or 20 Wh/l was achieved.

All the carbonaceous electrodes of the abovementioned capacitors have relatively low specific capacitances. Especially low values of specific capacitance (30–100 F/g) are common for non-aqueous electrolytes due to the larger dimensions of the organic molecules. In A. B. McEwen, H. L. Ngo, J. L. Goldman, T. Blakleay, W. F. Averill, //Proc. $7^{th}$ Int. Seminar on DLC and Similar Energy Storage Devices, Dec. 8–10, 1997, Deerfield Beach, Fla., USA., very high for non-aqueous electrolytes specific capacitances (123–129 F/g) were obtained. In this study, electrolytes based on cyclic aromatic imidazole salts were used. The main disadvantage of the capacitors employing non-aqueous electrolytes is their low specific conductivity, which predetermines their low specific power.

Aqueous solutions provide considerably higher values of capacitance. A list of specific capacitances for 34 different types of activated carbons and cloths measured in 30% solution of electrolyte is given elsewhere H. Shi, Electrochimica Acta, 41 (1996) 1633. These carbons with specific surface area ranging from 552 to 2571 $m^2/g$ exhibited capacitances from 94 to 413 F/g.

From technical point of view closest to the present invention is the procedure proposed in Yu. Volfkovich, V. M. Mazin, N. A. Urisson, Russian Electrochemistry, 34 (1998) 825, which deals with DEL capacitors employing polarizable activated carbon electrodes and aqueous solutions of $H_2SO_4$ and KOH. According to this study, said electrodes were subjected to electrochemical pretreatment consisting of keeping them at certain potential until the current densities dropped to 0.2–0.8 $mA/cm^2$. The values of the potential applied ranged from the minimum carbon potential (−0.15 to 0 V vs. reference hydrogen electrode in the same solution, RHE) to the maximum carbon potential (+0.9 to +1.2 V vs. RHE). According to Yu. Volfkovich, V. M. Mazin, N. A. Urisson, Russian Electrochemistry, 34 (1998) 825, widening of the working range was ruled out because of the conjectured generation of hydrogen and oxygen. Same opinion was expressed by other authors (see e.g., N. A. Urisson, G. V. Steinberg, M. R. Tarasevich, N. M. Zagudayeva, Soviet Electrochemistry, 19 (1983) 275). The electrochemical pretreatment or formation of the polarizable activated carbon electrodes described in Yu. Volfkovich, V. M. Mazin, N. A. Urisson, Russian Electrochemistry, 34 (1998) 825 leads to a substantial increase in the specific capacitance of these electrodes, and therefore, to improvement of the resulting properties of the EDL capacitor as a whole. A disadvantage of the pretreatment method proposed in Yu. Volfkovich, V. M. Mazin, N. A. Urisson, Russian Electrochemistry, 34 (1998) 825 and N. A. Urisson, G. V. Steinberg, M. R. Tarasevich, N. M. Zagudayeva, Soviet Electrochemistry, 19 (1983) 275 is the relatively narrow potential range applied, whereas it is known that the larger the potential, the higher the capacitance in F/g.

SUMMARY OF THE INVENTION

Contrary to other studies in this field, we ascertained that hydrogen evolution on carbonaceous materials occurs only at very negative potentials. Depending on the carbonaceous material, the hydrogen evolution reaches noticeable rate at potentials more negative than the range of −0.25 to −1.2 V vs. RHE that is typical for most of the carbons. We succeeded to advance to such negative potentials owing to the use of special current collectors made of graphite, which has high hydrogen-evolution overpotential. As for other scientists, they use platinum current collectors as a rule (see e.g., N. A. Urisson, G. V. Steinberg, M. R. Tarasevich, N. M. Zagudayeva, Soviet Electrochemistry, 19 (1983) 275). The hydrogen-evolution overpotential on platinum is close to zero, therefore at E<0 V hydrogen evolution occurs. Thus, the electrochemical properties of carbonaceous electrodes were previously studied only at E>0 V. We proved experimentally that polarizable electrodes made of different types of activated carbon have very high values of hydrogen-evolution overpotentials (in the range of −0.25 to −1.2 V vs. RHE). Other scientists mistakenly took the substantial increase of the current on the voltammograms during cathode charging of carbonaceous materials for hydrogen evolution process. According to our data, this increase of current is caused by formation of surface compounds due to the reduction of the different groups existing on the carbon surface. This results from the fact that the shift of the potential towards negative values (which takes place during charge of the negative polarizable electrode of the EDL capacitor) brings about a maximum of the current instead of unlimited increase, i.e., a slump follows the rise. This is illustrated on FIG. 1 by curve 1, obtained between −0.8 and +1.0 V vs. RHE at a scan rate of 1 mV/s. The electrode used was a TSA-type activated carbon cloth. The corresponding voltammogram 2 for the same electrode measured in the usual range from 0 to +1 V is provided as well. It can be seen that the area under curve 1 is three times the area under curve 2. Since the area is proportional to the capacitance, it follows that the proposed method leads to substantial increase in the capacitance of the electrodes.

The object of the present invention is to develop an EDL capacitor, employing an aqueous electrolyte, with improved specific energy. Another object of the present invention is to ensure the hermeticity of said capacitor. These objects are achieved by a method of electrochemical pretreatment, i.e., formation and charge of the negative polarizable electrode, which is described below. In accordance with the present invention, the negative polarizable electrode is set at certain potential prior to operation, whereas the minimum potential value is within the range of −0.25 to −1.2 V vs. hydrogen electrode in the same solution. Thus, the useable potential range for said electrode is substantially widened (up to twice and more), since the limiting maximum value is kept at +1.2 V vs. RHE as in study H. Shi, Electrochimica Acta, 41 (1996) 1633. Increase of the working potential range results in augmented capacity of the carbonaceous material in C/g or in Ah/g. According to the proposed method of formation, the evolution of gases (hydrogen and oxygen) at the electrodes comes to an end during the formation process and on subsequent operation of the capacitor practically no noticeable gas evolution takes place. As a result, total hermeticity of the capacitors can be provided.

Formation of activated carbon electrodes according to the proposed invention leads to two- to fivefold increase of the capacity of said electrodes. Formation according to the proposed invention results in completely sealed capacitor as well.

In a preferred embodiment of the invention the formation of the negative polarizable carbonaceous electrode of an EDL capacitor is carried out in unsealed device. The capacitor is placed in a hermetic chamber under a flow of an inert gas (e.g., nitrogen or argon), which passes through an ante-bubbler filled with electrolyte or water. Following the pretreatment, the capacitor is sealed. Such procedure is important, because active gases are evolved during the formation process, namely hydrogen at the negative electrode and oxygen at the positive one. When no flow of inert gas is applied, the active gases diffuse to the opposite electrode, thereby impeding the formation. These gases are blown out together with the inert gas and the formation process is unimpeded. The capacitor is subsequently sealed.

In another preferred embodiment of the invention, the capacitor device is supplied with valves prior to formation. The extra pressure is relieved through these valves and then the capacitor sealed. In this formation mode, some extra pressure of hydrogen arises inside the capacitor, which prevents further evolution of hydrogen on the negative electrode. Thus, charge of this electrode down to lowest possible potential range (from −0.25 to −1.2 V) is enabled, providing substantial increase in capacity.

It is expedient to use a separator and/or an electrode or both electrodes having longitudinal channels (flutes) on one or both surfaces for effective gas transport. This is particularly important for big-size electrodes. When active gas transport from the central part of the electrode to its external part is impeded, large amount of electrolyte can be splashed out during the formation process, which is undesirable because it causes considerable deterioration in performance of the capacitor. The above-mentioned channels facilitate the gas removal, thereby improving the performance of the device. On FIG. 2, a separator having such channels is schematically shown.

Step-like changes of the external resistance are preferable for proper current control during the formation and charge of the negative polarizable electrode of an EDL capacitor. Such changes are to be performed so that at the first step (down to the potential range of 0 to −0.45 V vs. RHE) the current density ranges from 3 to 20 mA/cm$^2$; at the second step (down to the potential range of −0.25 to −1.2 V vs. RHE) the current density ranges from 10 to 60 mA/cm$^2$; and at the third step (at the potential reached at the second step) the current density ranges form 3 to 20 mA/cm$^2$, while charging time ranges from 2 to 12 hours. The necessity of such step-like formation is stipulated by the shape of the charge curve, which contains a maximum in the negative potential range. Hence, in this potential range the current is to be increased, otherwise no further shift of potential occurs, which is necessary to reach the range of −0.25 to −1.2 V vs. RHE.

Another way to achieve the same results is to charge the capacitor at 3 to 20 mA/cm² over a prolonged period of time (8 to 80 hours) down to the final potential of the negative electrode between −0.25 and −1.2 V vs. RHE.

Still another mode of formation to achieve the same goal consists in single or multiple charge-discharge process, whereas each discharge ends at maximum potential ranging from +0.9 to +1.3 V vs. RHE, and each charge ends at minimum potential ranging from −0.25 to −1.0 V vs. RHE.

The formation and charge of the negative electrode of an EDL capacitor containing two polarizable carbonaceous electrodes includes a pre-reduction (chemical or electrochemical) step. In order to avoid corrosion of the positive electrode at charge, its capacitance is kept 1.5 to 3 times that of the negative one. The two electrodes are assembled and charge current density of 2 to 20 mA/cm² is applied.

It is expedient to terminate the formation and charge process after the time-dependant potential passes through a minimum. Increase of the current after the minimum is due to hydrogen evolution, which is undesirable because can lead to seal failure.

BRIEF DESCRIPTION OF THE DRAWINGS

On FIG. 1, two voltammograms of an electrode made of TSA activated carbon cloth are represented: curve 1 corresponding to potential range from −0.8 to +1 V vs. RHE, and curve 2 to potential range from 0 to +1 V vs. RHE. The scan rate is 1 mV/sec in both cases.

Figure 4:
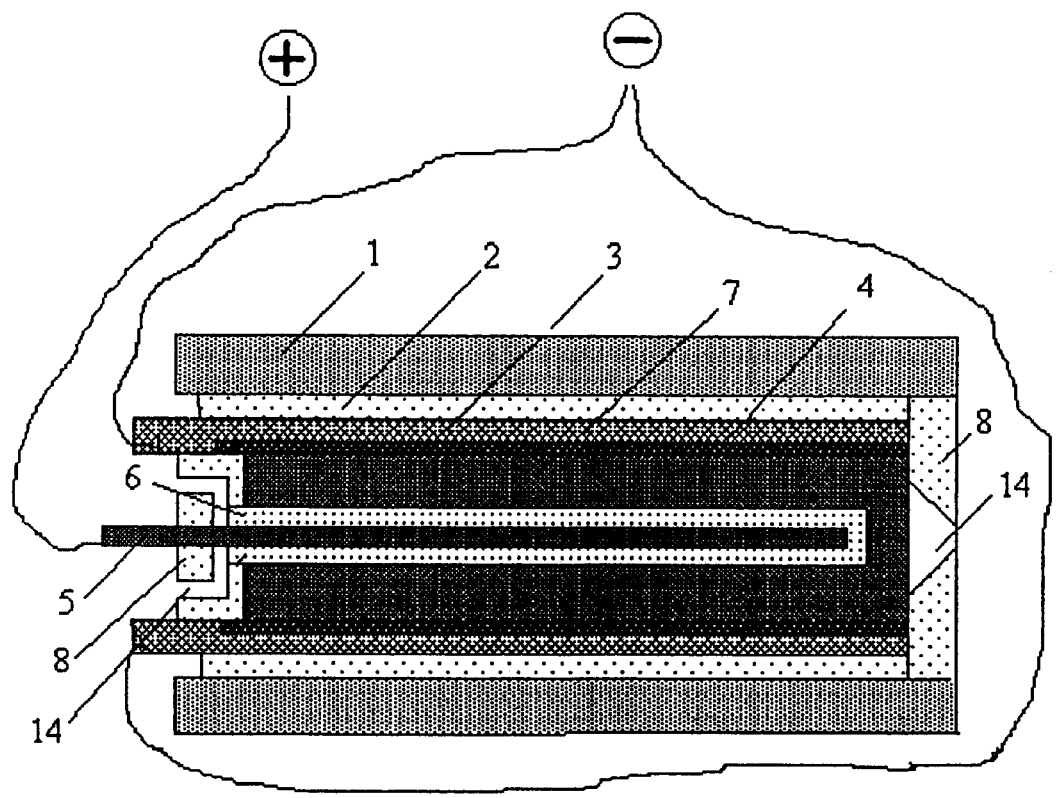

On FIG. 4, a capacitor supplied with formation valves is shown.

Figure 5:
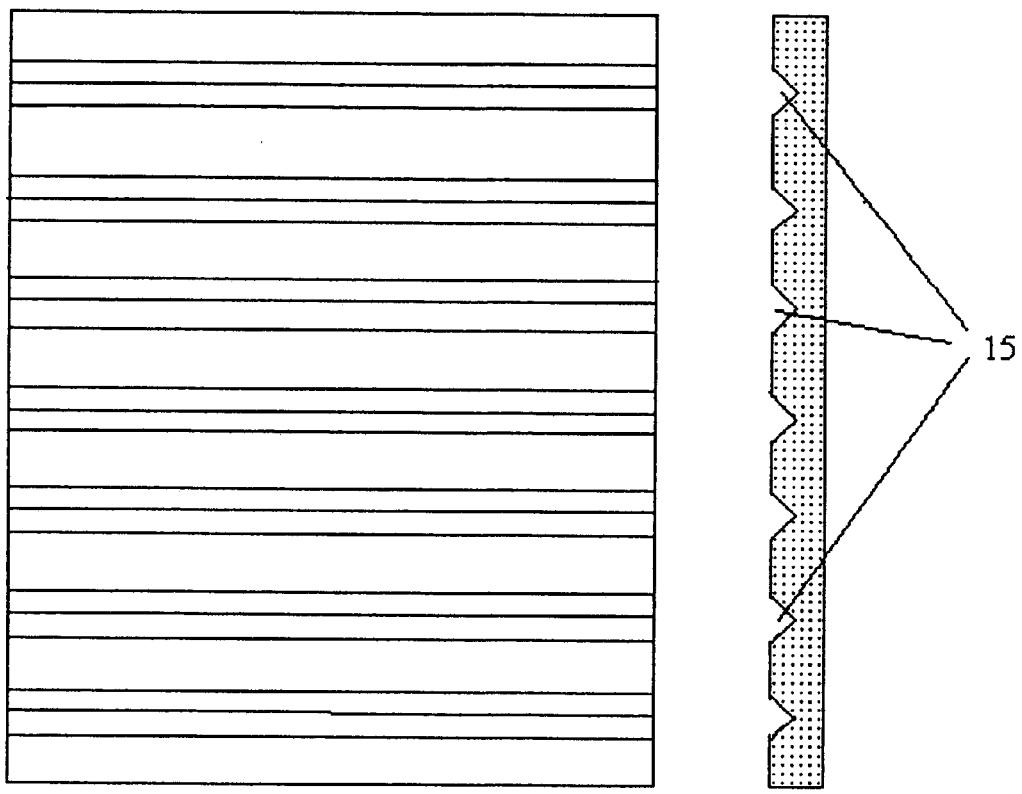

FIG. 5 depicts a separator with drain flutes.

Figure 6:
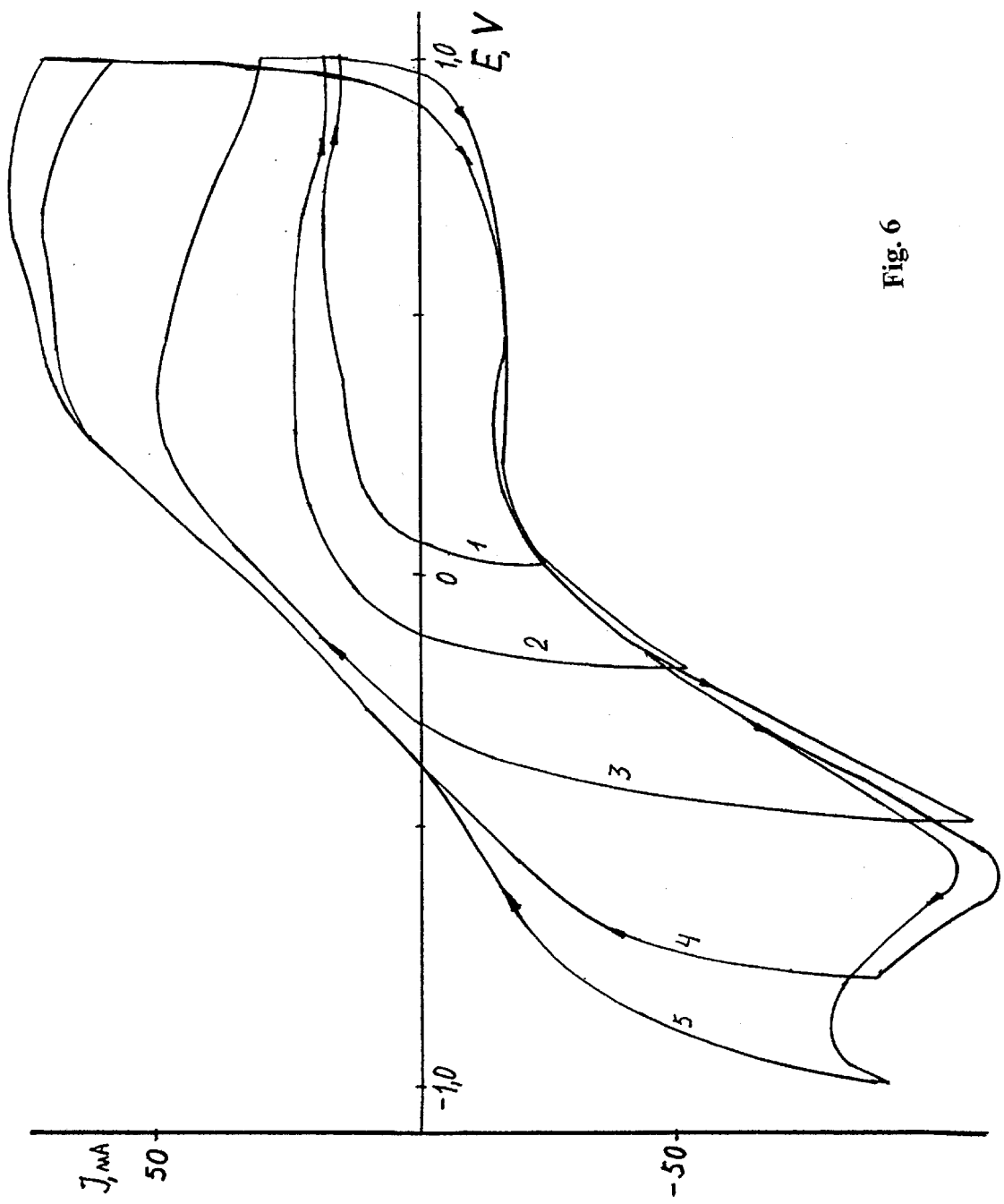

On FIG. 6, several voltammograms of a double electrode made of TSA activated carbon cloth are represented. In this figure, the positive scan limit is 1 V, while the negative scan limit varies as follows: 0 V for curve 1, −0.2 V for curve 2, −0.5 V for curve 3, 0.8 V for curve 4, and −1.0 V for curve 5. The scan rate is 1 mV/sec.

DETAILED DESCRIPTION OF THE INVENTION

Numbers on the drawings designate the corresponding objects: 1—steel pressure covers; 2—insulator; 3—copper current collector of the negative electrode; 4—graphite current collector of the negative electrode; 5—positive electrode with active mass based on $PbO_2/PbSO_4$ system; 6—separator; 7—negative carbonaceous electrode; 8 and 13—sealant; 9—body; 10—longitudinal flutes on the positive electrode; 11—hermetic chamber; 12—bubbler filled with sulfuric acid solution; 14—temporary valves; 15—longitudinal flutes on the separator.

Figure 1:
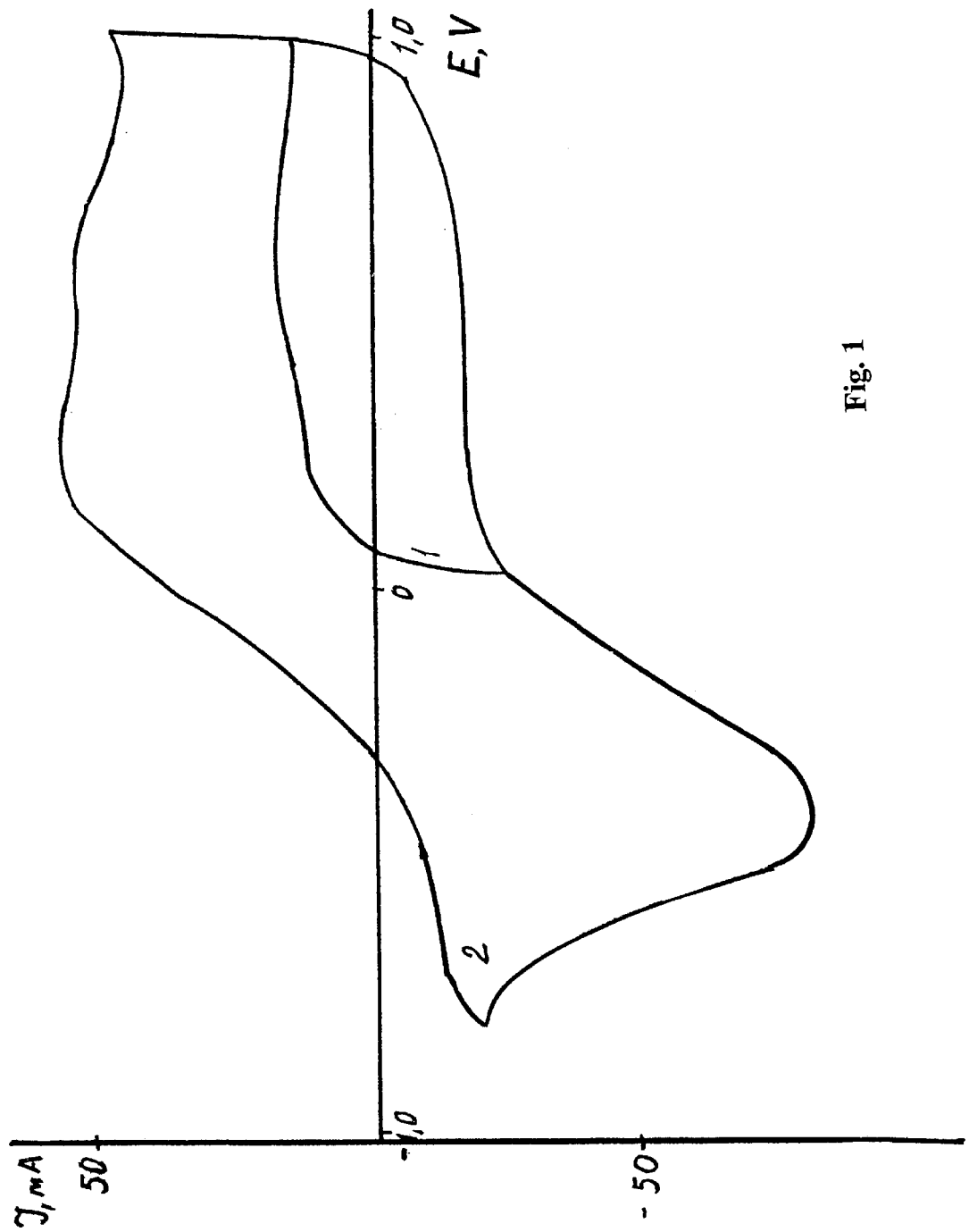
Figure 2:
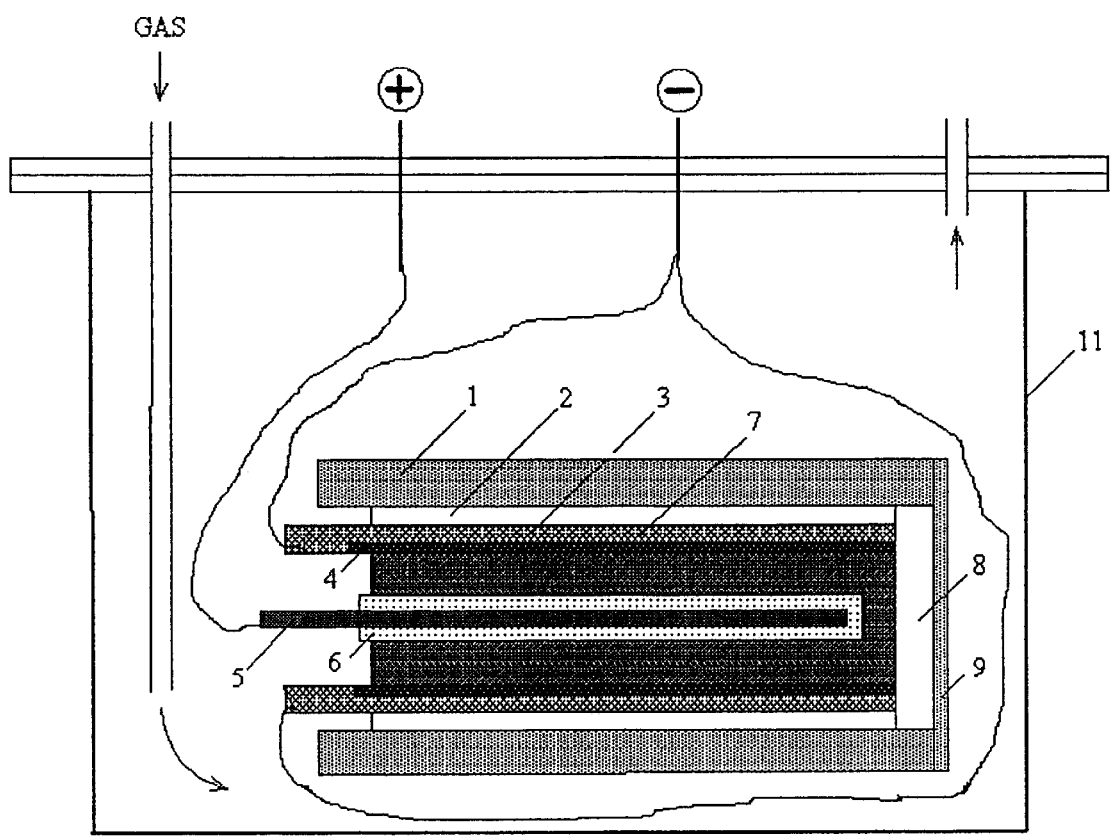
FIG. 2 depicts a capacitor containing two negative carbonaceous electrodes and one po-sitive electrode based on $PbO_2/PbSO_4$ active mass during formation in a hermetic chamber.

In a first embodiment of the present invention, which is shown in FIG. 2, a hybrid EDL capacitor (FIG. 2) included two connected substantially identical negative electrodes 7 and a positive electrode based on $PbO_2/PbSO_4$ active mass located in between. Each negative electrode included six layers of TSA activated carbon cloth, the layer thickness being 0.3 mm. The electrode dimensions were 123×143 mm. Grace-type separators 6 were placed between the electrodes. A 35% solution of sulfuric acid served as electrolyte. The current collectors of the negative electrodes 4 were made of non-porous graphite. Body 9, insulator 2 and steel pressure covers 1 were the remaining construction elements of the capacitor.

Figure 3:
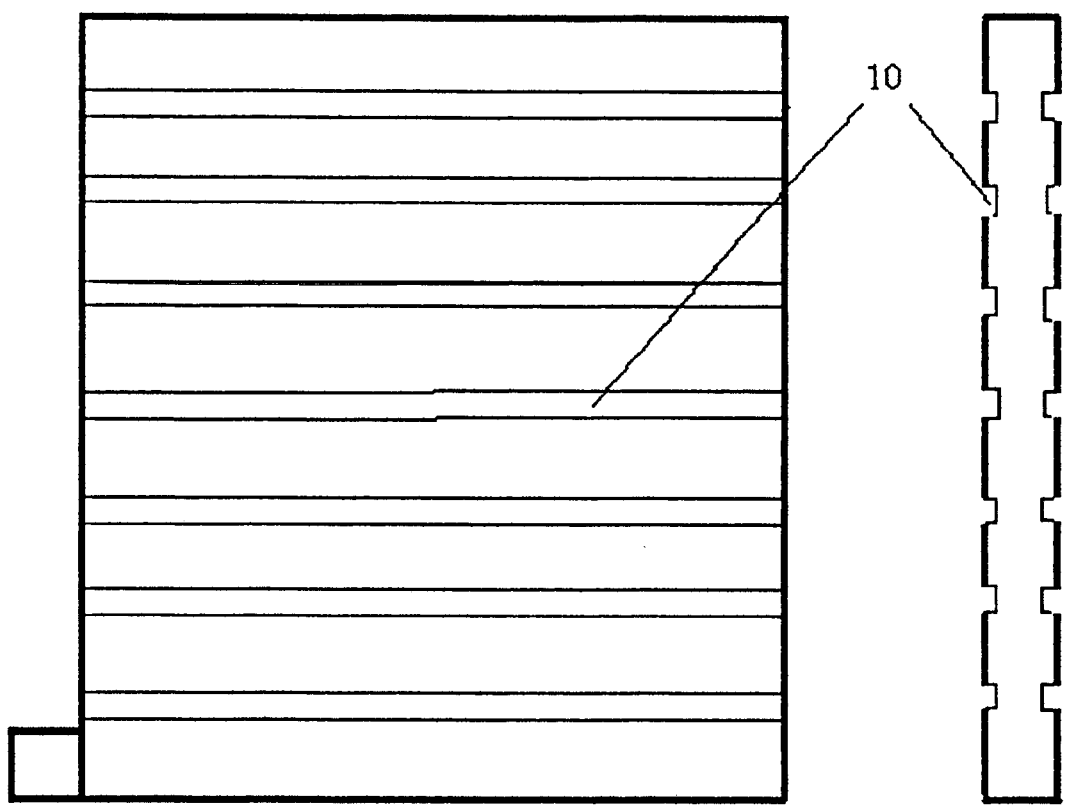
FIG. 3 depicts a $PbO_2/PbSO_4$ electrode with drain flutes.

Prior to sealing, a mercury/mercuric sulfate reference electrode was used. 1.0 mm wide and 0.2 mm deep longitudinal flutes 10 (FIG. 3) were made on both surfaces of the positive electrode. The unsealed capacitor was placed in a hermetic chamber 11 under weak flow of nitrogen, which passed through an ante-bubbler 12 filled with a 35% solution of sulfuric acid. During the formation process, the charge current density changed as follows: 1) 10 mA/cm² up to 2.0 V, the potential of the negative electrode being 0.0 V vs. reference hydrogen electrode in the same solution (RHE); 2) 30 mA/cm² up to 3.0 V, the potential of the negative electrode being −0.8 V vs. RHE; 3) 10 mA/cm² for 4 hours. The pretreatment stopped when the time-dependant potential passed through a minimum. At this point the voltage was 2.9 V and the potential of the negative electrode was −0.75 V vs. RHE. After discharge down to 1.0 V at 10 mA/cm² the capacitor was taken out the chamber and sealed with polymer sealant 13. Formation was followed by 5 charge-discharge cycles, then by step-like charge according to the procedure described above, and by discharge at 5 mA/cm². As a result, the negative polarizable electrode exhibited specific capacitance of 740 C/g, while the specific energy of the capacitor was 27 Wh/kg.

In a second embodiment, the device in question was similar to that described above, except that the negative polarizable electrodes are based on activated carbon ADG instead of activated carbon cloth. Formation process may be carried out in the following way: charge at current density of 5 mA/cm² was performed for 24 hours, the end-of-charge voltage being 2.7 V and the negative electrode potential −0.6 V vs. RHE; discharge at 10 mA/cm² followed down to 1.0 V, then the capacitor may be taken out the hermetic chamber and sealed with polymer sealant. Next step consisted in 3 charge-discharge cycles. Charge according to the procedure described above and discharge at 5 mA/cm² were the final steps of the pretreatment. The resulting specific capacitance of the negative electrode was 790 C/g, and the specific energy of the capacitor reached 30.5 Wh/kg.

In a third embodiment, as shown in FIG. 4, the device in question was similar to that described in the first embodiment, with the addition of four temporary valves 14 that were placed on the rim between the positive electrode and the separator (FIG. 4). These valves are 2 cm long pipes with internal diameter of 1 mm, made of fluorinated polymer. The capacitor rim was all sealed except for the points where the valves stood. For better gas-transport, the polyethylene-aerosil-based separator 6 was supplied with longitudinal flutes 0.5 mm in width and 0.1 mm in depth (FIG. 5). In contrast to the first embodiment, no hermetic chamber was used and the evolved gases were released through the mentioned valves instead.

A charge at 5 mA/cm² was performed up to 3.0 V, the potential of the negative electrode being −0.85 V. When the potential of said electrode passed through minimum vs. time, the current was turned off for an hour, then the valves were cut and the holes sealed with polymer sealant. Five charge-discharge cycles followed. Subsequently, step-like charge was carried out as described above and finally the capacitor was discharged at 5 mA/cm². Such pretreatment resulted in specific capacitance of the negative polarizable electrode of 860 C/g and specific energy of the capacitor of 33 Wh/kg.

EXAMPLES

Example 1

The device in use was identical to that described in the second embodiment, set forth above. The formation process differed in some cycling parameters. Three charge-discharge cycles were performed instead of one with current density of 10 mA/cm². The end-of-charge voltage was 0.6 V, the potential of the negative electrode being 1.1 V vs. RHE; the end-of-discharge potential was −0.9 V vs. RHE. Discharge at 10 mA/cm² followed the formation. The resulting specific capacitance of the negative polarizable electrode and specific energy of the capacitor were 790 C/g and 29.5 Wh/kg, respectively.

Example 2

The capacitor in this example employed two electrodes made of TSA activated carbon cloth 0.3 mm in thickness, the negative consisting of a single layer, and the positive of two layers. FIG. 6 shows five voltammograms of this system obtained at scan rate of 1 mV/sec in the potential range form 1.0 V to the corresponding final values: 0 V (curve 1); −0.2 V (curve 2); −0.5 V (curve 3); −0.8 V (curve 4); and −1.0 V (curve 5). The cathode branches stand for charge, while the anode ones stand for discharge of the negative electrode. The cathode branches of curves 4 and 5 exhibit maxima at 0.55 V, curve 5 testifying on sharp increase of the current, which most probably corresponds to hydrogen evolution. Extra area and thus extra discharge capacity was obtained under the anode branches of curves 2, 3, and 4. The anode part areas of curves 4 and 5 were basically equal, which renders the discharge capacities equal as well. One can see that enlargement of the potential window by 0.8 V in the negative direction brings about 4.8-fold increase in discharge capacity of the negative polarizable electrode (from 197 to 945 C/g).

Example 3

The hybrid capacitor used in this example was similar to that described in Example 1 in its polarizable electrodes, but a positive electrode of the NiOOH/Ni(OH)$_2$ type was employed instead of PbO$_2$/PbSO$_4$ and 30% aqueous solution of KOH served as electrolyte. A multi-step formation charge was performed as follows: at the first step (down to 0.25 V vs. RHE) the current density was 7 mA/cm²; at the second step (down to −0.55 V vs. RHE) the current density was 15 mA/cm²; at the third step the current density was kept at 7 mA/cm² for 5 hours. Three charge-discharge cycles followed then charge as described above and finally discharge at 7 mA/cm² was performed. The resulting specific capacitance of the negative polarizable electrode was 750 C/g.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

These examples show that implementation of formation procedures according to the present invention leads to 3 to 4.8-fold increase in specific capacitance of activated carbon electrodes up to 945 C/g. Specific energy of 33 Wh/kg was achieved, too. Such values of both specific capacitance and energy have not been reached before by EDL capacitors. As a result of formation process according to the present invention, complete sealing of the capacitor is provided as well.

We claim:

1. A method of formation and charge of a negative polarizable electrode of an electric double layer capacitor having a positive electrode and an aqueous electrolyte solution, comprising:

pretreating the electric double layer capacitor by keeping the negative polarizable electrode at a desired minimum potential prior to use, wherein the minimum potential ranges from about −0.25 to about −1.2 V vs. a reference hydrogen electrode in the same aqueous electrolyte solution.

2. The method of claim 1, wherein the pretreatment of the electric double layer capacitor is performed in a hermetic chamber under flow of an inert gas, wherein the inert gas passes through an ante-bubbler filled with electrolyte or water; and further wherein the capacitor is then sealed.

3. The method of claim 2, wherein the inert gas is selected from nitrogen or argon.

4. The method of claim 1, further comprising attaching at least one temporary valve to the capacitor for providing at least one path for release of extra gas pressure during the pretreatment step, and further wherein the capacitor is then sealed.

5. The method of claim 1, wherein the capacitor further includes a separator and wherein at least one of the separator, the positive electrode and the negative electrode has at least one longitudinal flute on a surface for easing gas flow.

6. The method of claim 1, wherein charge is performed by step-like change of external resistance in a manner such that a current density at a first step ranges from about 3 to about 20 mA/cm², wherein the first step ends when the potential of the negative electrode is within a range of about 0.0 to about −0.45 V vs. a reference hydrogen electrode; wherein the current density at a second step ranges from about 10 to about 60 mA/cm², wherein the second step ends when the potential of the negative electrode is within a range of about −0.25 to about −1.25 V vs. a reference hydrogen electrod; the current density at a third step ranges from about 3 to about 20 mA/cm², wherein the third step lasts for about 2 to about 12 hours.

7. The method of claim 4, wherein the capacitor is charged at a current density ranging from about 3 to about 20 mA/cm² for about 8 to about 80 hours down to a final potential of the negative electrode within the range of about −0.25 to about −1.2 V vs. a reference hydrogen electrode.

8. The method of claim 1, wherein the negative electrode is discharged for about 5 to about 50 hours at a potential ranging from 0.9 to 1.3 V vs. a reference hydrogen electrode; and wherein this discharge step precedes a charge step down to a minimum potential ranging from about −0.25 to about −1.2 V vs. a reference hydrogen electrode.

9. The method of claim 1, wherein at least two charge-discharge cycles are performed; further wherein the maximum discharge potential ranges from about 0.9 to about 1.3 V vs. a reference hydrogen electrode and the minimum charge potential ranges from about −0.25 to about −1.2 V vs. a reference hydrogen electrode.

10. The method of claim 1, wherein reduction of the negative electrode is performed prior to assembly; the positive polarizable electrode has a capacitance of from about 1.5 to about 3 times higher than the capacitance of the negative electrode; and wherein the charge following assembly of the capacitor is performed at current density ranging from about 2 to about 20 mA/cm$^2$.

11. The method of claim 10, wherein reduction of the negative electrode is performed using a chemical or electrochemical reduction.

12. The method of claim 1, wherein the formation and charge of the capacitor is terminated when a time-dependant potential passes through a pre-selected minimum.

* * * * *